Dec. 3, 1957 D. W. NORWOOD 2,815,171
DEVICE FOR DETERMINING ILLUMINATION BALANCE FOR
COMBINED SUNLIGHT-FLASHLIGHT PHOTOGRAPHY
Filed Jan. 4, 1955 3 Sheets-Sheet 1

INVENTOR.
Donald W. Norwood.
BY
Knight + Rodgers
ATTORNEYS.

Dec. 3, 1957 D. W. NORWOOD 2,815,171
DEVICE FOR DETERMINING ILLUMINATION BALANCE FOR
COMBINED SUNLIGHT-FLASHLIGHT PHOTOGRAPHY
Filed Jan. 4, 1955 3 Sheets-Sheet 2

INVENTOR.
Donald W. Norwood.
BY
Knight & Rodgers
ATTORNEYS.

Dec. 3, 1957  D. W. NORWOOD  2,815,171
DEVICE FOR DETERMINING ILLUMINATION BALANCE FOR
COMBINED SUNLIGHT-FLASHLIGHT PHOTOGRAPHY
Filed Jan. 4, 1955  3 Sheets-Sheet 3

INVENTOR.
Donald W. Norwood.
BY
Knight & Rodgers
ATTORNEYS.

United States Patent Office 2,815,171
Patented Dec. 3, 1957

2,815,171

DEVICE FOR DETERMINING ILLUMINATION BALANCE FOR COMBINED SUNLIGHT-FLASHLIGHT PHOTOGRAPHY

Donald W. Norwood, Pasadena, Calif., assignor to Donald H. Norwood, trustee, Pasadena, Calif.

Application January 4, 1955, Serial No. 479,699

12 Claims. (Cl. 235—64.7)

This invention relates to photography and more particularly to a simple and compact device for determining flash illumination adjustments in photographing three-dimensional subjects having some surface areas illuminated principally by a primary light source, and other surface areas which receive relatively little illumination by the primary light source and are illuminated by a secondary flash source directionally separated from the primary light source, to produce a desired balance between the quantities of illumination supplied to the subject by the two sources and a desired illumination contrast effect on the subject. The primary light source is generally a source of relatively steady illumination such as direct sunlight, indirect sunlight, or steady artificial light, and may be referred to hereinafter, for convenience, as sunlight. The secondary flash source may be either a single use combustion type flash bulb or a multiple use electronic-type flash device. It is so positioned relative to the subject as to be directionally separate from the primary light source and thereby illuminate shadow areas created by the primary light source, that is, surface areas of the subject which receive relatively little illumination by the primary light source.

This application is a continuation-in-part of my application Ser. No. 381,392, filed September 21, 1953, which became abandoned January 8, 1955.

The broad object of the invention is to provide a compact, convenient and accurate accessory device to enable the photographer to solve the problem of adjusting the flash illumination for film exposures under such illumination conditions, to provide a desired balance between the illuminations supplied by the two sources. The desired ratio between the amount of illumination of the subject by the secondary light source and the amount of illumination of the subject by the primary light source will depend upon the contrast effect sought by the photographer. In most instances, the secondary light source is used merely to fill in the shadow areas created by the primary light source and, accordingly, the approximate ratio between the amounts of illumination supplied by the secondary and primary light sources to the areas lighted by the respective sources will usually be in the range between 1/4 : 1 and 1/2 : 1. In some instances, the ratio may be as low as 1:1 where uniform lighting is desired or may be even an inverse ratio, say 2:1, so that a foreground object illuminated by the flash source will stand out sharply.

Usually the device of the present invention will be used with some type of exposure meter which for any given light value from the primary light source will disclose a series of $f$. stops or camera aperture adjustments paired with a corresponding series of shutter time adjustments, each of which pairs will result in correct exposure with the given primary light source. Since the exposure meter provides the shutter time adjustments so conveniently correlated with the $f$. stop adjustments, the shutter time factor may be omitted from the factors taken into account in the construction of the present accessory device in certain practices of the invention. If the accessory device is to be used with electronic-type flash sources, for example, the shutter time factor need not be represented on the accessory device by any scale or indicating means because the duration of an electronic flash is much shorter than the shortest exposure provided by any conventional camera shutter. It is also to be noted that in using combustion type flash sources it is possible to assume a relatively long shutter time interval for all exposures, say an exposure interval of 1/25 second, and thus make it possible to eliminate the shutter time factor, since in all instances the duration of the flash will be less than 1/25 second.

With the shutter time factor omitted, the following five basic factors must be taken into consideration in the construction of an accessory device of the present type for solving the problem of adjusting the flash illumination for balanced sunlight-flashlight exposure:

(1) Distance of the flashlight source from the subject being photographed, i. e., the distance factor.

(2) Effective light developed by the flash. This may be called the flashlight factor or simply the flash factor.

(3) Speed rating or relative sensitivity of the film. This speed rating may be called the film sensitivity factor.

(4) Diameter of the camera aperture relative to the focal length of the lens. This may be called the aperture factor.

(5) Approximate ratio between the amounts of illumination supplied by secondary and primary light sources within the exposure period to provide a desired contrast effect. This may be called the contrast factor.

One object of certain practices of the invention, therefore, is to provide a simple accessary device that will enable a photographer to correlate these five factors to arrive at the solution to a problem of balanced sunlight-flashlight exposure. In other practices of the invention, the object is to provide such a device that will correlate six factors to arrive at the solution, the sixth factor being the shutter time factor. In still other practices of the invention, the object is to include as a further factor the effect of any screen or diffusing means that may be employed to modify the light from the flash source. This added factor may be the sixth factor, if the shutter time factor is omitted, but usually will be the seventh factor with the shutter time factor included. It may be called the screen factor.

In general, these broad objects are attained by providing three overlapping relatively movable scale members comprising a first front member, a second intermediate member and a third back member respectively. The three members form a forward pair and a rearward pair with the intermediate member common to both pairs. The members of one of these two pairs have indices for cooperation to correlate the flash factor with the film sensitivity factor; the members of the other pair cooperate to correlate the distance factor with one of the other factors in the problem; and the two pairs of members have indicating means marked thereon for cooperation of the two pairs with each other to correlate other factors in the problem. With reference to correlation of the contrast factor, usually one of the two outer members is provided with indices representing different values of the contrast factor and the other of the outer members has suitable indicating means marked thereon for cooperation with the contrast indices to correlate the contrast factor with the other factors in the problem. As will be explained, the indicating means may be a single index mark or may be a scale or set of indices.

To understand the principle of operation of the invention it is helpful to consider the three scale members as comprising three pairs of members used to correlate three pairs of indicating means, each of which indicating means may be a scale, or a set of indices or a single index. If five factors are handled one of the six indicating means may be a single index mark. If seven factors are handled, two of the indicating means will be two-dimensional scales as will be explained. The three pairs of scale members to handle the six pairs of indicating means will be the front and intermediate scale members, the intermediate and back scale members and finally, the front and back scale members. Since any two of these three pairs of scale members have a scale member in common, correlating the positions of any two of the three pairs necessarily correlates the positions of the third pair.

The three scale members may be adapted for either relative linear movement or relative rotary movement. In the preferred practices of the invention, the relative movement is rotary and the three scale members comprise three relatively rotatable concentric disc members. In this regard, a feature of the invention is the concept of making one of the three discs larger in diameter than the other two to serve as a base member to be held in the hand for the purpose of adjusting each of the other two members relative thereto.

With reference to those practices of the invention in which flash bulbs of the combustion-type are used as distinguished from flash devices of the electronic-type, an important object is to attain certain advantages by combining the shutter time factor with two other factors. This object is accomplished by combining the shutter time factor with the flash factor and also with the film sensitivity factor. In carrying out this concept, the flash factor scale is constructed to represent the flash factor as limited by the shutter time factor in all instances where the flash factor is so limited, and the film factor scale represents the film factor combined with the shutter time factor.

The two scales involving the shutter time factor in this manner are what may be termed two-dimensional scales. One of the three scale members has a scale with two dimensions representing the shutter time factor and the flash factor, respectively, and for cooperation therewith another of the three scale members has a scale with two dimensions representing the shutter time factor and the film sensitivity factor, respectively. In the preferred practices of the invention wherein the scale members are rotary members, the two-dimensional scales are polar grid scales, that is, scales whose values are plotted according to polar coordinates.

A further specific object of the invention in conjunction with combustion type flash bulbs is to provide an arrangement of two overlapping scale members which will make it possible to adjust the two members relative to each other for correlation of the two-dimensional scale values on one of the members with the two-dimensional scale values on the other. A feature of the invention is the concept of attaining this object by placing the two scales on overlapping portions of the two members with the outermost overlapping portion made of transparent material so that both of the two-dimensional scales will be visible simultaneously for guidance in the setting of the two scales relative to each other.

With reference to the use of transparent material, a further feature of the preferred practice of the invention is the use of two disc members having overlapping transparent portions covering a scale on the third disc member to make possible reading of the covered scale through the two overlying scale members. Such an arrangement has certain advantages in making it possible to restrict the dimensions of the device and in making it possible to extend a scale or set of indices over half the circumferential dimension of a rotary disc.

The various features, objects, and advantages of the invention will be apparent from the following detailed description considered with the accompanying drawings.

In the drawings, which are to be regarded as merely illustrative.

Figure 3:
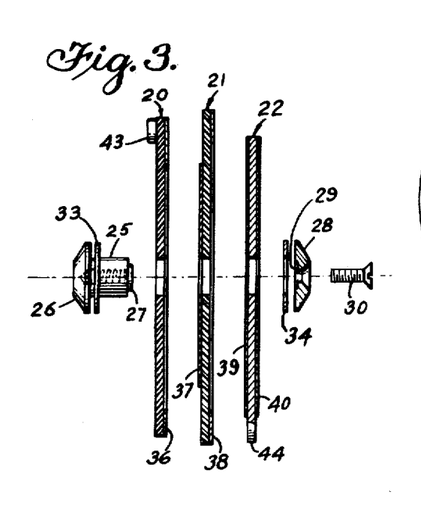
Fig. 3 is an exploded cross-sectional view taken as indicated by the line 3—3 of Fig. 1.

The first embodiment of the invention shown in Figs. 1 to 6 comprises three overlapping relatively rotatable disc-shaped scale members, namely, a first front outer disc 20, a second intermediate disc 21, and a third back outer disc 22. These three discs are mounted for relative rotation concentrically on a suitable pivot means. As best shown in Fig. 3, the pivot means may comprise a cylindrical body 25 extending through central apertures in the three discs, this body having a circular flange or head 26 at one end, the other end terminating in a short portion 27 of reduced diameter. A suitable cap member 28, having a recess 29 to receive the end portion 27, is united with the cylindrical body 25 by means of a suitable screw 30 that extends through the cap member axially into the cylindrical body.

It is contemplated that the three discs will be placed under light axial compression by the flange head 26 and the cooperating cap member 28 to create sufficient friction between the contacting surfaces of the three discs to cause the discs to tend to maintain positions to which they are adjusted. Thus the frictional resistance will, for example, permit disc 20 to be adjusted rotatably relative to disc 21 and then cause disc 20 to maintain such adjustment while the operator adjusts disc 22 relative to disc 21. Preferably the axial spacing between the head 26 of the cylindrical body 25 and the cap member 28 is sufficient to permit the insertion of a felt ring 33 between the head and the disc 20 and the insertion of a second felt ring 34 between the cap 28 and the third disc 22. Such felt rings not only provide desirable friction surfaces, but also are desirably yielding in character.

While the three discs 20, 21 and 22 may be made of any suitable material and may be fabricated in any suitable manner, preferably the intermediate disc and at least one of the two outer discs are made of transparent material such as a suitable clear plastic, and preferably each of the discs is provided with a facing member united therewith to carry printed scales and indices.

Figures 1, 2:
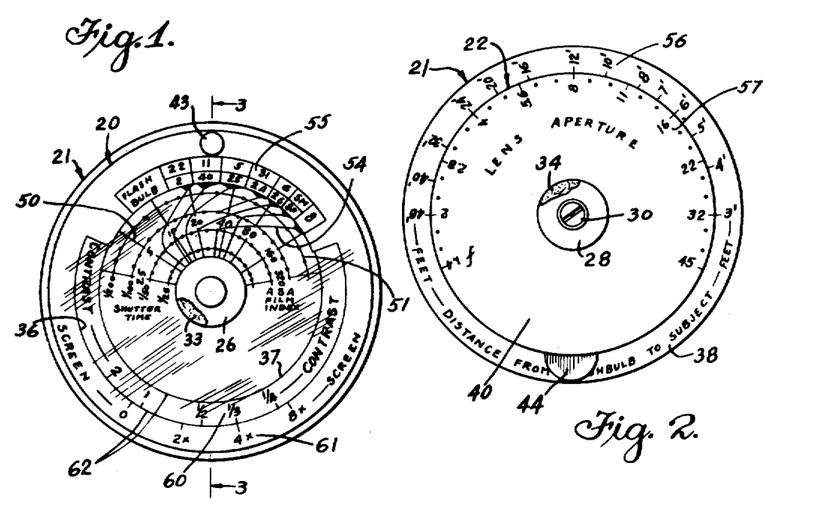
Fig. 1 is a front face view of a selected embodiment of the invention for use with flash bulbs of the single-use combustion type.
Fig. 2 is a back face view of the same embodiment.
Figure 5:
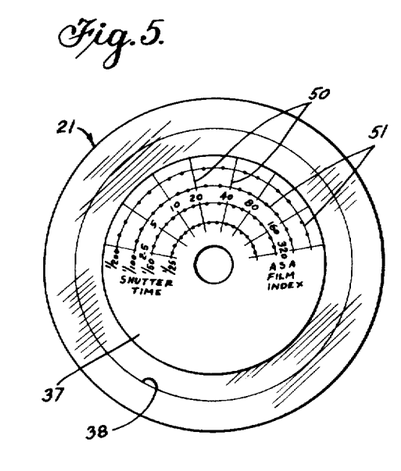
Fig. 5 is a front face view of the intermediate scale member in the first embodiment of the invention.

In the particular construction shown in Figs. 1 to 6, the front disc 20 is transparent and has a ring shaped facing sheet 36 of paper or the like bonded to its rear face; the intermediate disc 21 is also transparent and has a circular facing sheet 37 bonded to its forward face as indicated in Figs. 3 and 5; a ring shaped facing sheet 38 is also bonded to the rear face of the intermediate disc 21 as indicated in Figs. 2 and 3; and the back disc 22 has a circular facing sheet 39 on its front face and a similar circular facing sheet 40 on its rear face as shown in Fig. 3. It has been found that the surfaces of paper facing sheets provide the desired degree of frictional resistance to relative rotation when the three discs are maintained under slight axial pressure.

The two transparent discs or scale members 20 and 21 are preferably made of clear synthetic plastic material having high light transmitting characteristics and a relatively high index of refraction, preferably about 1.5 or higher, such as polymethyl methacrylate or other methacrylate polymer, or a polystyrene plastic. The use of a clear highly transparent plastic material having a high index of refraction is particularly advantageous in connection with a device having two such superimposed scale members overlying a third member. It greatly facilitates reading scales or indices on the intermediate member 21, and a scale or indicating means on the front face of the rear scale member 22 which is viewed through the front and intermediate members as described hereinafter, because the high index of refraction serves to direct light rearwardly to indicating means located behind the front scale member or behind the front and intermediate scale members, and also making such rearwardly disposed indicating means appear closer than they actually are to the front surface of the device and to more forwardly located indicating means with which they cooperate.

Preferably one of the three discs is larger in diameter than the other two to serve as a base member when the operator manipulates the device to arrive at the solution of an illumination balance problem. In this first embodiment of the invention, the intermediate disc 21 has the largest diameter and it will be apparent that this arrangement makes it convenient for the operator to grasp the periphery of the intermediate disc with one hand and adjust the two outer discs relative thereto with the other hand. Preferably the two outer discs are provided with projections at their peripheries to facilitate their adjustment relative to the intermediate disc. Thus in this first embodiment of the invention, the front disc 20 has a small body 43 mounted as a knob on its forward face and the back disc 22 is formed with a radial extension or tab 44.

In this first embodiment of the invention, the front face of the facing sheet 37 on the intermediate transparent disc 21 is provided with a two-dimensional scale in the form of polar grid scale. As shown in Fig. 5, the polar grid scale has a plurality of spaced radial grid lines 50 and a plurality of radially spaced concentric grid lines 51. The radial grid lines 50 represent the film sensitivity factor and are marked in terms of the conventional A. S. A. ratings of film speed or sensitivity, from 2.5 to 320 A. S. A. The concentric arcuate grid lines 51 representing values of the shutter time factor are marked for four speeds from $\frac{1}{25}$ second to $\frac{1}{200}$ second, each successive grid mark reducing the shutter time by half. Since the front outer disc 20 is transparent, this two-dimensional scale for the film sensitivity factor and the shutter time factor is conveniently visible therethrough for guidance in adjusting the forward disc and the intermediate disc relative to each other.

Figure 4:
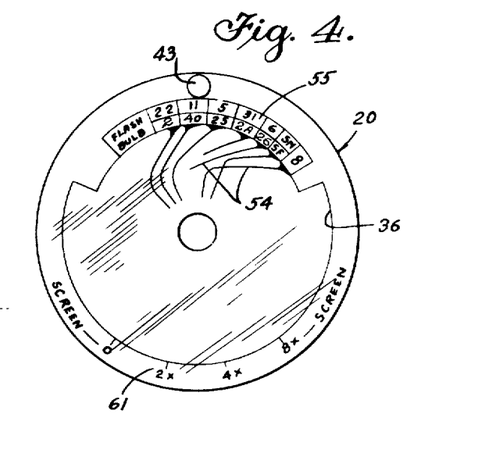
Fig. 4 is a front face view of the front scale member in the first embodiment of the invention.

For cooperation with the described two-dimensional scale on the intermediate disc 21, the transparent front disc 20 carries a coacting two-dimensional scale which also involves the shutter time factor. Since the concentric shutter time factor values are the same on both scales and since the two dimensional scale on the intermediate disc 21 is visible through the front disc 20, concentric grid lines corresponding to the concentric grid lines 51 are omitted on the front disc 20, but, of course, they may be added if desired. On the front two dimensional polar grid scale, as best shown in Fig. 4, a series of lines 54 represent the flash factor as limited or modified by the shutter time factor. These lines represent different flash sources, as may be understood by inspecting the marginal series of numbers 55 on the disc 20 identifying various flash bulbs. It will be noted that the modified flash factor lines 54 are of broken or curved configuration and in nearly all instances change direction between points of intersection with the successive concentric shutter factor grid lines 51. It is to be noted, moreover, that in each instance the change in direction is towards radial alignment with respect to the axis of rotation of the scale member rather than away from such radial alignment, and some of the lines actually terminate in such radial alignment.

The significance of the modified flash factor lines 54 with respect to their distribution and changes in direction may be understood by considering the characteristics of different flash sources. Each line represents the relationship between the shutter time, plotted radially, and the effective illumination value of the corresponding flashlight source, that is, the total illumination produced by the flash source during the different shutter time intervals, plotted circumferentially. Some flash sources start very rapidly. Others start slowly but later rise rapidly to a peak of intensity and then fall off rapidly. Some have a relatively flat illumination-level curve over a relatively long period. Some have an extremely short period of very intense illumination. As shown by the tabulation of members 55 in Fig. 4, the commonly used flashlight bulbs fall into groups with respect to their total illumination output and with respect to the shape of their time-intensity curves.

Each of the lines 54 intersects the concentric shutter factor grid for $\frac{1}{200}$ second at a point which corresponds to the portion of the total quantity of light generated by a flashbulb of the given type that reaches the film within the limited time period of $\frac{1}{200}$ second. In most instances, the shutter factor of $\frac{1}{200}$ second is a limiting factor because most flashbulbs provide illumination for a longer period than $\frac{1}{200}$ second. The fact that $\frac{1}{200}$ second is a limiting factor in most instances in indicated by the non-radial direction of the lines 54 between the $\frac{1}{200}$ second grid and the $\frac{1}{100}$ second grid line as may be seen in Fig. 1. $\frac{1}{100}$ second is also a limiting factor in most instances as indicated by the fact that most of the lines 54 are also non-radial in direction between the $\frac{1}{100}$ second grid line and the $\frac{1}{50}$ second grid line. In some instances, the $\frac{1}{50}$ second shutter factor is not limiting, as shown by the fact that the line 54 that represents S. M. and S. F. flashbulbs, extends inward in a true radial direction from the $\frac{1}{50}$ second grid to the $\frac{1}{25}$ second grid.

In this instance, the series of numbers 55 are printed on the forward face of the ring shaped facing sheet 36 that is bonded to the rear face of the transparent front disc 20 and the lines 54 are printed or etched on the back surface of the transparent disc 20 itself.

It is apparent that in this first embodiment of the invention the front disc 20 and the intermediate disc 21 constitute a pair of scale members that may be adjusted relative to each other to correlate the flash factor with the film sensitivity factor. It is further contemplated in this first embodiment of the invention that the intermediate disc 21 and the back disc 22 will function as a second pair of scale members for adjustment relative to each other to correlate the aperture factor with the distance factor.

For the purpose of this second correlation, the back face of the ring-shaped facing sheet 38 that is bonded to the back of the intermediate disc 21 is provided with indices forming a distance factor scale 56 shown in Fig. 2. To cooperate with the distance factor scale 56, the rear face of the circular facing sheet 40 that is bonded to the rear side of the back disc 22 carries an aperture factor scale 57. It will be noted that both of these scales are exponential scales in which values double over equal distances along the scales. Thus in the distance scale 56, the distance between the scale marks for 3 feet and 6 feet respectively equals the distance between the scale mark for 6 feet and the scale mark for 12 feet, and is likewise equal to the distance between the 12 foot graduation and the 24 foot graduation. In like manner, on the aperture factor scale 57 *f*. 22, which represents twice the area of the aperture *f*. 32, is spaced 22½ degrees from *f*. 32, and *f*. 16, *f*. 11, etc. are spaced apart by the same distance.

Figure 6:
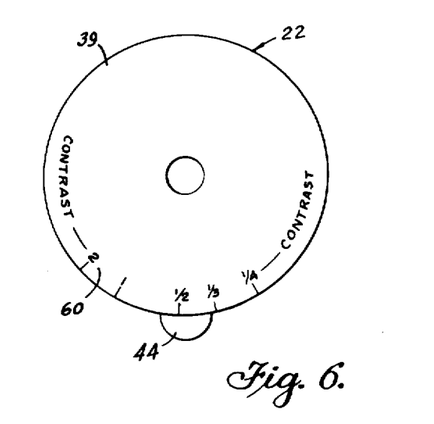
Fig. 6 is a front face view of the third or back scale member of the first embodiment.

This first embodiment of the invention is further characterized by the fact that the two outer discs 20 and 22 cooperate to correlate the contrast factor with the other factors, thereby completing the correlation of factors that is necessary to arrive at the desired information about the adjustment of the flash illumination required for balanced sunlight-flashlight exposure. For this purpose, the forward face of the facing sheet 39 that is bonded to the forward face of the back disc 22 has printed thereon a suitable contrast factor scale 60 as shown in Figs. 1 and 6. On this scale numeral ⅓, for example, represents a ratio of approximately ⅓:1 between the illumination by the flash of the areas of the subject lighted thereby and the illumination by the sun of the areas of the subject lighted directly by the sun. It is contemplated that the contrast factor scale 60 will be suitably positioned on the area of the back disc 22 for cooperation with indicating means carried by the front disc 20. The indicating means carried by the front disc 20 comprises at least one index mark and may comprise a series of marks constituting a scale or set of indices representing different degrees to which the light from the flash source may be modified by any screen or diffusing means that may be employed by the photographer. Since this first embodiment of the invention is to be used with flash bulbs of the conbustion type and since it is quite feasible to use screens of various degrees of effectiveness to intercept and modify the light from the flash, the front disc 20 is provided with indicating means in the form of a series of index marks 61 representing the screen factor. As best shown in Fig. 4, the screen factor scale 61 may be printed on the forward face of the ring shaped facing sheet 36 that is bonded to the rear side of the front disc 20. On this screen factor scale 61, 2*x* represents a screen which reduces the illumination by half, 4*x* represents a screen which will reduce the illumination 75%, that is, to ¼ of the full illumination generated by the flash, and so on up to any desired value of screen factor. The zero mark on this scale represents the use of no screen to modify the effect of the flash.

In order to permit the contrast factor scale 60 on the front face of the back disc 22 to be observed through the two overlying transparent discs 20 and 21, the facing sheets 36, 37 and 38 on said overlying discs are of such configuration as to provide a viewing opening. Thus, the internal diameter of the portion of facing sheet 36 adjacent the screen factor scale 61, and the internal diameter of the facing sheet 38, are each somewhat greater than the external diameter of the facing sheet 37, as shown for example in Fig. 3, so as to provide a viewing opening as indicated at 62 in Fig. 1, between the inner edges of facing sheets 36 and 38, and the outer edge of facing sheet 37, at the position of contrast factor scale 60 which is located adjacent the periphery of facing sheet 39 on the back disc 22. This serves to provide overlapping transparent portions of discs 20 and 21 overlying the contrast factor scale 60, through which said scale may be read in cooperation with the screen factor scale 61.

With a given type of film, a given source of flash illumination, and given aperture and shutter time adjustments, the photographer has a range of choice with respect to each of three different final factors in the illumination balance problem, namely, the contrast factor, the screen factor, and the distance factor. He may vary these three factors at will, but selecting values for any two will determine the value of the third factor. The described device permits the photographer to select values for any two of the three final factors and on the basis of such selection, quickly and simply arrive at the value of the third factor without need for any mental calculation whatsoever. The photographer may find the contrast in the ultimate image that will result from using a given reducing screen with a given flash source at a given distance from the subject; or with a given contrast to be sought in the final image and with a given flashlight source at a given distance from the subject, he may determine what reducing screen should be used to subdue the illumination from the flashlight; or with a given screen (or no screen) he may determine at what distance to place a given flashlight source from the subject to result in a given contrast in the ultimate image.

A feature of the invention is that it will not only determine the effects which will result from different choices with respect to these three factors, namely, the contrast factor, the screen factor, and the distance factor, but will also indicate the result of substituting one flash source for another or of substituting one type of film for another or of changing either the aperture factor or the shutter time factor.

The invention is capable of finding the value of a third factor from given values for two factors because as heretofore stated the three discs cooperate to correlate three pairs of indicating means, one pair being correlated by cooperation of one outer disc with the intermediate disc, a second pair being correlated by cooperation of the other outer disc with the intermediate disc, and the third pair being correlated by cooperation of the two outer discs with each other. Thus, in one procedure, one outer disc may be adjusted relative to the intermediate disc in accord with the given values of two of the factors, the other outer disc may be adjusted relative to the intermediate disc in accord with the given values of two other factors involved in the problem, and then finally, the value of the third unknown factor is found by noting the resultant adjustment of the two outer discs relative to each other. In an alternative procedure, one of the two outer discs may be adjusted relative to the intermediate disc in accord with known values of two of the factors, the other outer disc may then be adjusted relative to the first outer disc in accord with known values of two other factors involved in the problem, and then the resultant adjustment of the said other outer disc relative to the intermediate disc may be noted to ascertain the value of the factor that is required for solution of the illumination balance problem.

In a typical procedure with this first embodiment of the invention, the photographer meets the problem of balancing the flashlight illumination with the sunlight illumination by first measuring the sunlight illumination on the photographic subject, preferably by means of the incident-light type of photoelectric exposure meter. The photographer thereby ascertains a series of pairs of appropriate shutter time and lens aperture values. The camera controls are adjusted for one of the indicated pairs of shutter time and *f*. stop. With these values assumed, the photographer rotates the front disc 20 relative to the intermediate disc 21 to position the appropriate flash bulb characteristic curve 54 on the front disc 20 in registration with the point on the intermediate disc 21 at which the radial line 50 corresponding to the rating or sensitivity of the film intersects the concentric line 51 that corresponds to the given shutter time factor. This adjustment of the front disc relative to the intermediate disc correlates the flash factor, the film sensitivity factor and the shutter time factor.

The photographer next rotates the back disc 22 relative to the intermediate disc 21 to place the given value on the aperture scale 57 in register with the distance from the flash source to the photographic subject as indicated on the distance factor scale 56. This second step of adjusting the back disc 22 relative to the intermediate disc 21 correlates the aperture factor with the distance factor and since the intermediate disc 21 is involved in both these steps of adjustment, this second step results in correlation of all of the factors involved in the problem. The unknown value of the final factor, in this instance, the unknown value of the remaining screen factor, is ascertained by noting the adjustment of the two outside discs 20 and 22 relative to each other. Thus, the unknown screen factor is found by noting where the selected value for the contrast factor on the scale 60 on the back disc 22, as seen through the above mentioned viewing opening 62, falls with respect to the values on the screen factor scale 61 on the front disc 20. The fact that the portions of the front disc 20 and the intermediate disc 21 that overlie the contrast scale 60 on the back disc 22 are transparent make it possible to observe the positional relationship between the two scales 60 and 61.

Figs. 1 and 2 show, by way of example, how the three discs will be adjusted relative to each other for correlation of the following values:

Shutter time factor______________ 1/100 second.
Lens aperture factor_____________ f.8.
Film sensitivity factor___________ A. S. A. 20.
Flash factor_____________________ Flashbulb No. 25.
Distance factor_________________ 12 feet.
Contrast factor__________________ 1/3.
Screen factor____________________ 4x.

With the distance factor and the contrast factor at given values as shown above, this correlation reveals that the appropriate screen is a screen that will reduce the flash illumination to one-fourth. If the screen factor of 4x and the distance of 12 feet were given, this correlation of the three disc members would reveal the resulting contrast ratio to be 1/3:1. With the given screen factor value 4x and with a selected contrast ratio of 1/3:1, this particular correlation of the three discs would reveal the appropriate distance as 12 feet to achieve the required balance between the sunlight illumination and the flash illumination.

Figure 7:
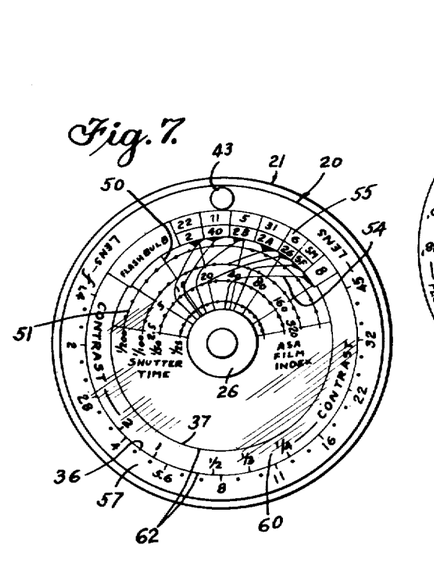
Fig. 7 is a front face view of a second embodiment of the invention for use with combustion-type flash bulbs.
Figure 8:
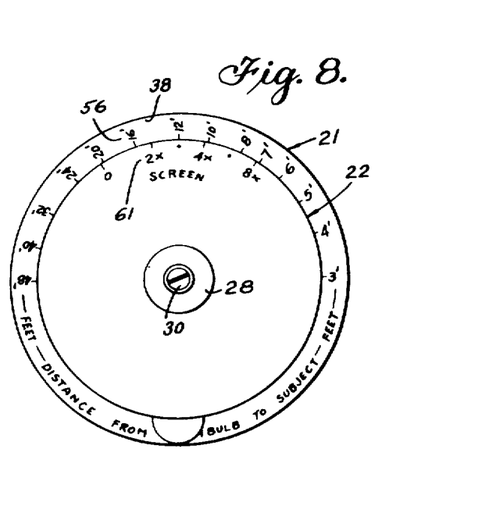
Fig. 8 is a back face view of the device shown in Fig. 7.

The second form of the invention shown in Figs. 7 and 8 is largely identical with the first embodiment of the invention as indicated by the use of corresponding numerals to indicate corresponding parts. The two two-dimensional scales on the front disc 20 and the intermediate disc 21 respectively are unchanged and the contrast scale 60 on the back disc 22 is unchanged. The distance factor scale 56 on the back of the intermediate disc 21 remains the same. In this second embodiment of the invention, however, the positions of the aperture factor scale and the screen factor scale are interchanged. Thus, as may be seen in Fig. 7, the lens aperture scale 57 replaces the screen factor scale 61 on the front disc 20 and cooperates with the contrast factor scale 60 on the back disc 22 as seen through the viewing opening 62, and, as may be seen in Fig. 8, the screen factor scale 61 replaces the lens aperture scale 57 on the back of the back disc 22 and cooperates with the distance factor scale 56 on the back of the intermediate disc 21.

It can be seen from the foregoing that the first embodiment of the invention is advantageous in revealing at a glance the various lens aperture values appropriate for different distances of the flash source from the photographic subject, and is further advantageous in revealing at a glance what contrast may be achieved by using different diffusing screens. On the other hand, the second embodiment of the invention is advantageous in revealing at a glance the effect of different aperture adjustments on the contrast and in revealing at a glance how different diffusion screens may be employed for different distances between the flash source and the photographic subject.

Figure 9:
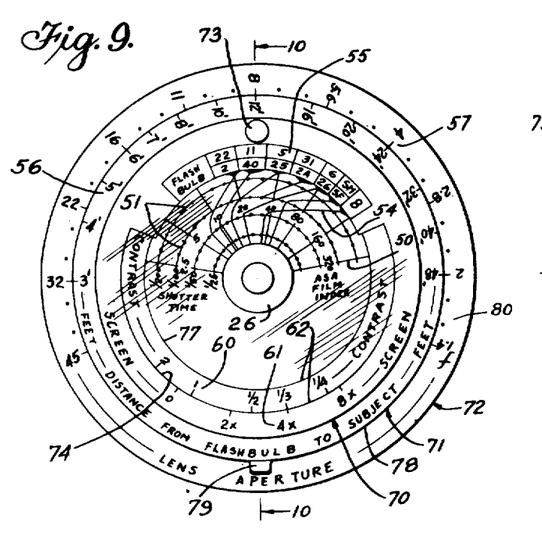
Fig. 9 is a front face view of a third embodiment of the invention for use with combustion-type flash bulbs.
Figure 10:
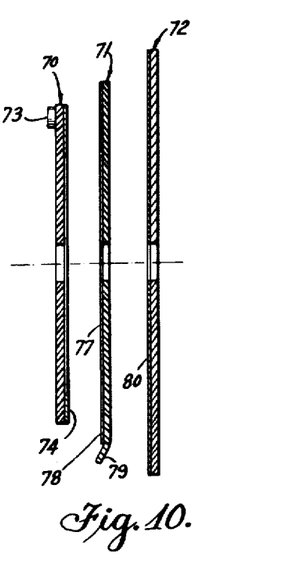
Fig. 10 is a sectional view of the three scale members in Fig. 9 taken as indicated by the line 10—10, the three members being spaced apart for clarity of illustration.

The purpose of Figs. 9 and 10 is to exemplify the fact that the device may be constructed, if desired, with all of the factor values visible from the front. This embodiment of the invention comprises a first front outer transparent disc 70, a second intermediate transparent disc 71 of larger diameter than the first disc, and a third back outer disc 72 of larger diameter than the intermediate disc. Thus each of the two discs back of the front disc has a marginal portion exposed for observation from the front.

The front disc 70, which may be provided with a convenient knob 73 near its periphery for the manual adjustment, has a ring-shaped facing sheet 74 bonded to its rear face and this facing sheet has printed thereon the numbers 55 identifying the different combustion-type flash bulbs and also has printed thereon, the screen factor scale 61. The two-dimensional scale that includes the numbers 55 is completed by the usual curves 54 on the back surface of the transparent front disc 70 representing the flash factor as modified or limited by the shutter time factor.

The intermediate disc 71 carries on its forward face a circular facing sheet 77 which has printed thereon the second two-dimensional scale comprising the radial grid lines 50 representing the film sensitivity factor and the concentric lines 51 representing the shutter time factor, which is visible through the transparent front disc. Also mounted on the front face of the intermediate disc 71 is a peripheral ring-shaped facing sheet 78 which projects beyond the periphery of the front disc 70 and on which is printed the distance factor scale 56. The intermediate disc 71 may be provided with a projecting tab 79 for manual adjustment.

The back disc 72 has bonded to its forward face a circular facing sheet 80 which carries a contrast factor scale 60, this contrast factor scale being visible through the transparent material of the intermediate disc 71 and the front disc 70 so that the position of the contrast scale relative to the screen scale 61 may be readily observed, the facing sheets 74, 77 and 78 being of such configuration as to provide a viewing opening at the position of the contrast scale, as indicated at 62 in Fig. 9. The circular facing sheet 80 also carries on its margin the usual aperture factor scale 57 which cooperates with the distance factor scale 56 on the intermediate disc 71.

In this form of the invention, the back disc 72 being the largest disc is the base scale member, i. e., the scale member which is manually held immobilized for adjustment of the other two discs. The manner in which the three discs are adjusted relative to each other for the solution of a problem in balancing sunlight exposure with flash exposure will be readily understood from the previous discussion of the first form of the invention.

Figure 11:
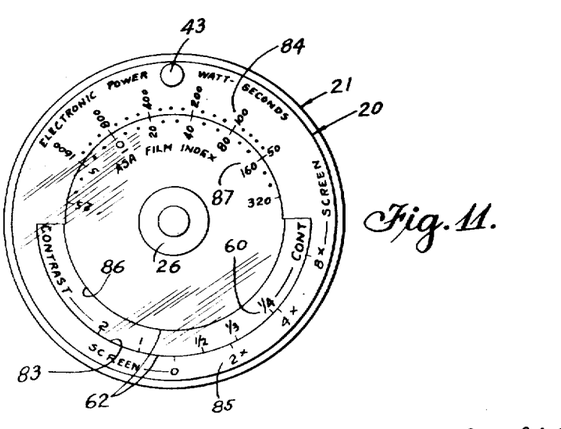
Fig. 11 is a front face view of a fourth embodiment of the invention for use with electronic-type flash devices.

The fourth embodiment of the invention shown in Fig. 11 is largely similar to the first embodiment of the invention as indicated by the use of corresponding numerals to indicate corresponding parts. The device has the same three discs 20, 21 and 22, and the back face view is exactly the back face view of the first form of the invention shown in Fig. 2.

This fourth embodiment of the invention is especially adapted for use with electronic flash devices as distinguished from use with flash bulbs that produce light by combustion. As heretofore pointed out, the effective illumination produced by an electronic flash device is independent of the shutter time, since the duration of the flash is always much less than the shortest shutter time of any conventional camera. It is not necessary, therefore, to use two-dimensional scales to combine the shutter time factor both with the flash factor and with the film sensitivity factor.

In this last embodiment of the invention, the front disc 20 has bonded to the rear face thereof a ring-shaped facing sheet 83, corresponding to sheet 36 in Fig. 3. On the front surface of the facing sheet 83 is printed a flash factor scale 84 which represents the illumination rating of various electronic flash devices. Also printed on the front surface of the facing sheet 83 is indicating means in the form of a screen factor scale 85 comparable to scale 61 in Fig. 1, for cooperation with a contrast factor scale 60.

The intermediate disc 21 has on its forward face a circular facing sheet 86, corresponding to sheet 37 in Fig. 3, on the front surface of which is printed a film sensitivity scale 87 which cooperates with the flash factor scale 84, and has on its rear face a facing sheet carrying a distance factor scale 56, in the same manner as described above in connection with Fig. 2. The third or back disc 22 is of the same construction and arrangement as the back disc 22 in the first embodiment of the invention shown in Figs. 1 to 6. It has the same scales including the lens aperture scale 57 on its rear face as shown in Fig. 2, and the contrast factor scale 60 on its front face, as shown in Fig. 11. The contrast factor scale 60 is visible through the viewing opening 62 provided by the overlapping transparent portions of the two forward discs 20 and 21 so that the position of the screen factor scale 85 on the front disc 20 relative to the contrast factor scale on the rear disc 22 may be readily observed.

In using the fourth embodiment of the invention for determining the proper adjustments for balancing flash illumination with sunlight illumination, the photographer first evaluates the sunlight illumination on the photographic subject by an incident-light type of photo-electric exposure meter. The adjustment of the calculator dial on the exposure meter establishes a series of combinations or pairs of shutter time factor values and lens aperture factor values that will result in correct exposure with respect to the illumination by the sun. The photographer then rotates the front disc 20 of the present accessory device relative to the intermediate disc 21, to register the watt-seconds power of the electronic flash source on the scale 84 with the film sensitivity factor on the scale 87 that represents the film in the camera.

He may then proceed as in the typical procedure described above in connection with Figs. 1 to 6, by rotating the back disc 22 relative to the intermediate disc 21 to place a given or selected aperture value on scale 57 in register with the desired distance factor value on scale 56 (as seen in Fig. 2), and then noting the related values of the contrast factor and screen factor as determined by the relative positions of the contrast factor scale 60 on the back disc 22 and the screen factor scale 85 on the front disc 20. Thus, with the discs adjusted to bring the scales to the relative positions shown in Figs. 2 and 11, the photographer may observe that a contrast ratio of about ⅔:1 may be obtained without the use of any screen to reduce the flash illumination, or that the use of various light reducing screens would result in other indicated contrast ratios.

In case it is not desired to use any screen to reduce the flash illumination, the photographer may follow a modified procedure in order to determine what values of aperture factor and distance factor may be used to provide a desired contrast ratio. Thus, after setting the front disc 20 relative to the intermediate disc 21 to bring the flash factor value on scale 84 into register with the film sensitivity value on scale 87 as described above, the back disc 22 may next be adjusted relative to the front disc 20 to bring the desired contrast factor value on scale 60 into register with the zero mark (representing no screen) on the screen factor scale 85.

The photographer then turns the device over to note on the back face where the measured or given distance value on the distance factor scale 56 (Fig. 2) registers with the aperture factor value on the scale 57 to indicate the appropriate f. stop to which the camera lens is to be adjusted. At this point, the photographer refers again to the adjusted photo-electric exposure meter to find which shutter time factor value registers with the particular given lens aperature factor value and he adjusts the camera accordingly.

In the particular adjustment of the fourth embodiment of the invention illustrated by Figs. 2 and 11, for example, the front disc 20 is adjusted relative to the intermediate disc 21 to place the 400 watt-seconds power value on the scale 84 in register with 20 A. S. A. on the film sensitivity factor scale 87. In carrying out the above described modified procedure, the front scale member 20 is next adjusted relative to the third or back scale member 22 to register the zero mark on the screen factor scale 85 with a position on the contrast factor scale 60 representing a desired contrast ratio of ⅔:1; and finally, these adjustments of the front disc relative to the intermediate disc and of the front disc relative to the back disc, determine the position of the back disc relative to the intermediate disc shown in Fig. 2 which reveals that the lens should be adjusted to f. 8 for photographing the subject at 12 feet to provide the desired contrast ratio without using any screen. When the photographer refers back to the photo-electric exposure meter with this information, he finds the correct shutter time for use with this indicated f. stop value.

Alternatively, if the photographer has selected a predetermined combination of lens aperture and shutter time factors from the range of combinations indicated by the exposure meter, he may determine from scale 56 the correct value of the distance factor for use with the selected aperture factor value, to provide the desired contrast ratio without the use of a screen.

The above described modified procedure for determining related values of aperture factor and distance factor which will produce a desired contrast ratio without the use of any screen to reduce the flash illumination is especially applicable to the last described embodiment of the invention for use with electronic flash devices because, as pointed out above, the effective illumination produced by an electronic flash device is independent of the shutter time. The photographer therefore has a wide choice of combinations of shutter time and lens aperture settings to provide correct exposure with respect to the sunlight illumination on the subject, and he may select the particular aperture value (with its related shutter time) which will provide the proper amount of flash illumination for a desired contrast effect without having to use a screen. It will be apparent, therefore, that the device shown in Fig. 11 may be modified by reducing the screen factor scale to a single index mark located at the position of the zero mark on scale 85. This simplified form of device, in which the indicating means representing the screen factor would comprise only a single index mark, may be used to carry out the modified procedure described above in connection with Fig. 11, by adjusting the back disc 22 relative to the front disc 20 to bring the desired contrast factor value on scale 60 into register with this single index mark, the procedure being otherwise the same as described and resulting in an indication of the appropriate aperture value on scale 57 corresponding to a given distance value on scale 56 (Fig. 2).

It will be readily apparent to those skilled in the art that the various indicating means, including scales, indices and single index marks may be distributed among the three discs in various ways and may be variously positioned on the individual discs. Among the various reversals that are possible and practical, the following may be mentioned. In the first embodiment of the invention, the two two-dimensional scales may be interchanged and reversed in direction, i. e., the two-dimensional scale relating to the film sensitivity factor may be on the front disc 20 instead of on the intermediate disc 21, and the two-dimensional scale relating to the film sensitivity factor may be on the intermediate disc 21 instead of on the front disc 20. The two scales for the aperture factor and the screen factor may also be interchanged and reversed in direction, i. e., the screen factor scale may be transferred from the front disc 20 to the rear face of the back disc 21 and the aperture factor scale may be transferred from the back disc 22 to the front disc 21, as shown in Figs. 7 and 8. It is also possible to interchange the aperture factor scale and the distance factor scale with reversals of their directions, i. e., to place the aperture factor scale on the back of the intermediate disc 21 instead of on the back of the back disc 22, and to place the distance factor scale on the back of the back disc 22 instead of on the back of the intermediate disc 21.

It is also to be noted that in some instances a scale or series of indices may be reduced to a single index mark. Thus, as brought out above in connection with Fig. 11, the screen factor scale may in some cases be reduced to a single index mark representing the use of no screen to reduce the flash illumination.

The possibilities of making the above and other interchanges and reversals may be understood when it is considered that there are three pairs of scales or indicating means on the three discs with the first and second discs cooperating to correlate one pair, the second and third discs cooperating to correlate the second pair, and the first and third discs cooperating to correlate the third pair. Obviously, the scales or indicating means of each pair of discs may be interchanged within the pair and the various pairs of scales or indicating means may be interchanged among the three pairs of discs.

My description in specific detail of selected specific embodiments of the invention will suggest to those skilled in the art various changes, substitutions, and other departures from my disclosure that may be made within the spirit and scope of the appended claims.

I claim:

1. A device for determining flash illumination adjustments in photographing three-dimensional subjects illuminated by a primary light source and a secondary flash source directionally separated from the primary light source to produce a desired illumination contrast effect on the photographic subject, on the basis of factors including the effectiveness of the flash source, the sensitivity of the film, the camera lens aperture, the distance of the flash source from the subject, and the approximate ratio between the amounts of illumination supplied by the secondary flash source and the primary light source to the areas of the subject lighted by the respective sources to produce a desired contrast effect, said device having in combination: three overlapping relatively movable scale members comprising a first front outer member, a second intermediate member, and a third back outer member, said first and second members constituting a first pair of cooperating members, said second and third members constituting a second pair of cooperating members, said first and third members constituting a third pair of cooperating members, said three members being provided with six indicating means including five scales representing the above five factors and index means for cooperation with one of said scales, said six indicating means being divided into three cooperating pairs on said three pairs of members respectively whereby the adjustment of the two members of any pair of members correlates the values of the corresponding pair of indicating means, and whereby the adjustment of two pairs of the members in accord with given values of the corresponding factors not only correlates the corresponding factors but also determines the adjustment of the members of the third pair of members relative to each other thereby correlating the remaining factors to solve an illumination balance problem.

2. A device as set forth in claim 1 in which one of the members of said third pair of members is provided with a contrast factor scale and the other member is provided with indicating means for correlation therewith.

3. A device as set forth in claim 1 in which one of said indicating means on said third member is covered by overlapping portions of the first and second members and in which said overlapping portions are made of transparent material for observation of said indicating means on the third member to permit correlation thereof with indicating means on the first member.

4. A device as set forth in claim 1 in which the members of one of said pairs of members are provided respectively with a two-dimensional scale representing the flash factor as modified by the shutter time factor and a two-dimensional scale representing the film sensitivity factor combined with the shutter time factor and in which the material of the outermost scale member of the pair is transparent for visibility of one of said two-dimensional scales therethrough to permit visual adjustment of the two two-dimensional scales relative to each other.

5. A device as set forth in claim 4 in which said three scale members are rotary members and said two two-dimensional scales are polar grid scales.

6. A device as set forth in claim 5 in which said two two-dimensional scales are on the first and second members respectively and said two members are made of transparent material to permit observation therethrough of an underlying indicating means on the third scale member for visual adjustment of the first and third members relative to each other.

7. A device as set forth in claim 1 in which said three scale members are three concentric relatively rotatable discs, and in which the intermediate disc is larger in diameter than the two outer discs to serve as a base member to be held in the operator's hand for adjustment of the two outer discs relative thereto.

8. A device as set forth in claim 1 in which said three scale members are three concentric relatively rotatable discs under slight axial pressure to provide slight frictional resistance to relative rotation of the discs; and in which the intermediate disc is larger in diameter than the two outer discs to serve as a base member to be held in the operator's hand for adjustment of the two outer discs relative thereto, and each of said outer discs has a projection near its periphery for engagement by the operator's finger to facilitate manual adjustment of the outer discs relative to the intermediate disc.

9. A device for determining flash illumination adjustments in photographing three-dimensional subjects illuminated by a primary light source and a secondary flash source directionally separated from the primary light source to produce a desired illumination contrast effect on the photographic subject, on the basis of factors including the effectiveness of the flash source, the sensitivity of the film, the camera lens aperture, the distance of the flash source from the subject, the effectiveness of screens that may be used to modify the flash illumination, and the approximate ratio between the amounts of illumination supplied by the secondary flash source and the primary light source to the areas of the subject lighted by the respective sources to produce a desired contrast effect, said device having in combination: three overlapping relatively movable scale members comprising a first front outer member, a second intermediate member, and a third back outer member, said first and second members constituting a first pair of cooperating members, said second and third members constituting a second pair of cooperating members, said first and third members constituting a third pair of cooperating members, said three members being provided with six indicating means representing different values of said six factors, said six indicating means being divided into three cooperating pairs of indicating means on said three pairs of members respectively, whereby the adjustment of the two members of any pair of members correlates the values of the factors represented by the corresponding pair of indicating means, and whereby the adjustment of two pairs of the members in accord with given values of the corresponding factors not only correlates the corresponding factors but also determines the adjustment of the members of the third pair of members relative to each other thereby correlating the remaining factors to solve an illumination balance problem.

10. A device as set forth in claim 9 in which the members of one of said pairs of members are provided respectively with a two-dimensional scale representing the flash factor as modified by the shutter time factor and a two-dimensional scale representing the film sensitivity factor combined with the shutter time factor and in which the material of the outermost scale member of the pair is transparent for visibility of one of said two-dimensional scales therethrough to permit visual adjustment of the two two-dimensional relative to each other.

11. A device as set forth in claim 9 in which the scale members of one pair of cooperating members are provided with correlated indicating means representing the effectiveness of the flash source and the film sensitivity; the scale members of another pair of cooperating members are provided with correlated scales representing the illumination contrast factor and the screen factor; and the scale members of the remaining pair of cooperating members are provided with correlated scales representing the lens aperture factor and the distance factor.

12. A device as set forth in claim 9 in which the scale members of one pair of cooperating members are provided with correlated indicating means representing the effectiveness of the flash source and the film sensitivity; the scale members of another pair of cooperating members are provided with correlated scales representing the illumination contrast factor and one of the two factors, camera lens aperture and distance of the flash source from the subject; and the scale members of the remaining pair of cooperating members are provided with correlated scales representing the screen factor and the other of the two factors, camera lens aperture and distance of the flash source from the subject.

References Cited in the file of this patent

UNITED STATES PATENTS

| | | |
|---|---|---|
| 753,840 | Barth et al. | Mar. 8, 1904 |
| 1,881,165 | Becker | Oct. 4, 1932 |
| 1,962,866 | Graham | June 12, 1934 |

UNITED STATES PATENT OFFICE
CERTIFICATE OF CORRECTION

Patent No. 2,815,171                                        December 3, 1957

Donald W. Norwood

It is hereby certified that error appears in the printed specification of the above numbered patent requiring correction and that the said Letters Patent should read as corrected below.

Column 15, line 3, after "two-dimensional" insert -- scales --.

Signed and sealed this 18th day of February 1958.

(SEAL)
Attest:

KARL H. AXLINE
Attesting Officer

ROBERT C. WATSON
Commissioner of Patents